Sept. 13, 1927.
T. A. BANNING, JR
1,642,193
LOCOMOTIVE POWER REVERSE GEAR
Filed Aug. 5, 1925    3 Sheets-Sheet 1
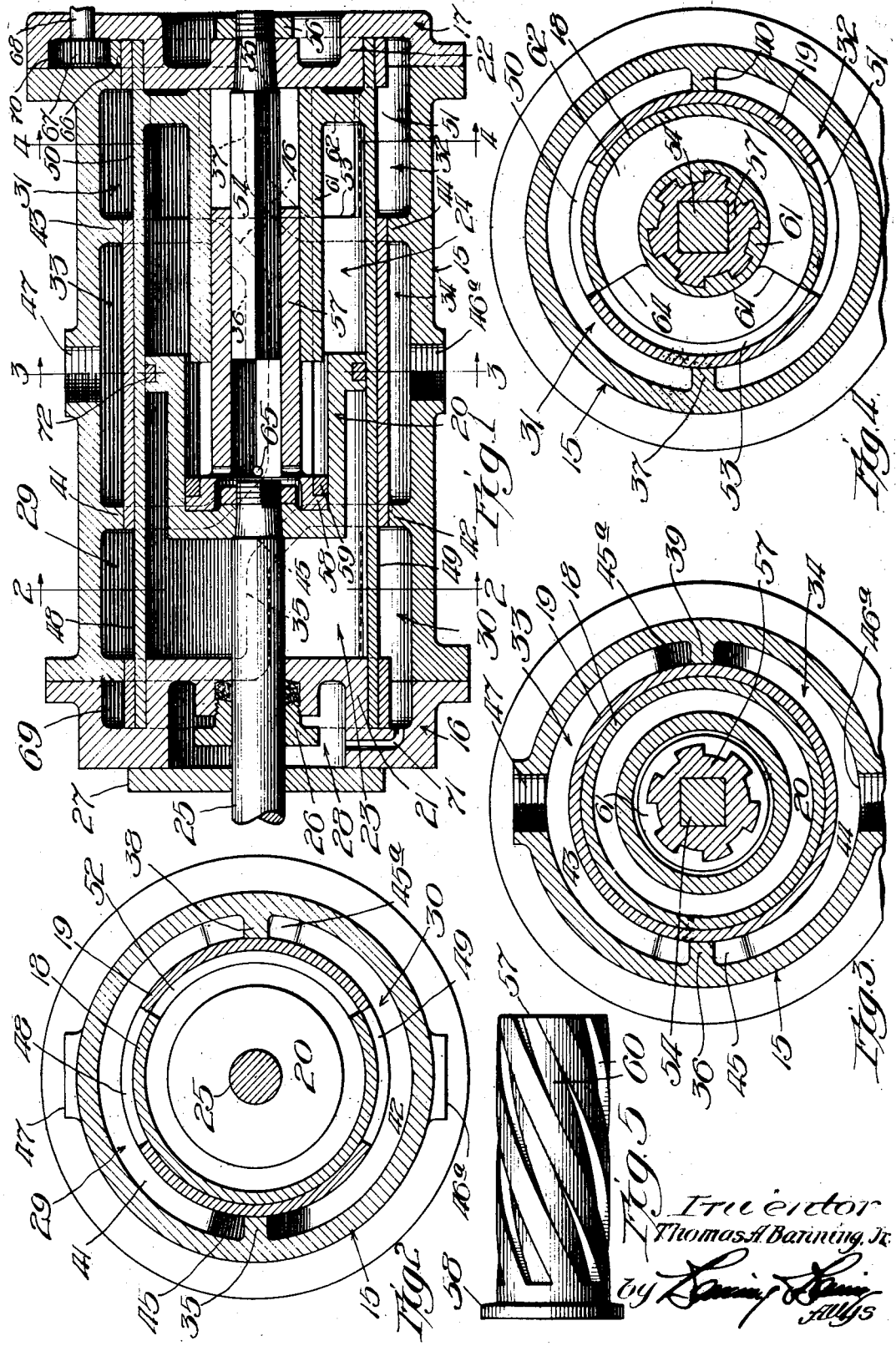
Inventor
Thomas A Banning, Jr.
by
Attys Sept. 13, 1927. 1,642,193
T. A. BANNING, JR
LOCOMOTIVE POWER REVERSE GEAR
Filed Aug. 5, 1925 3 Sheets-Sheet 2
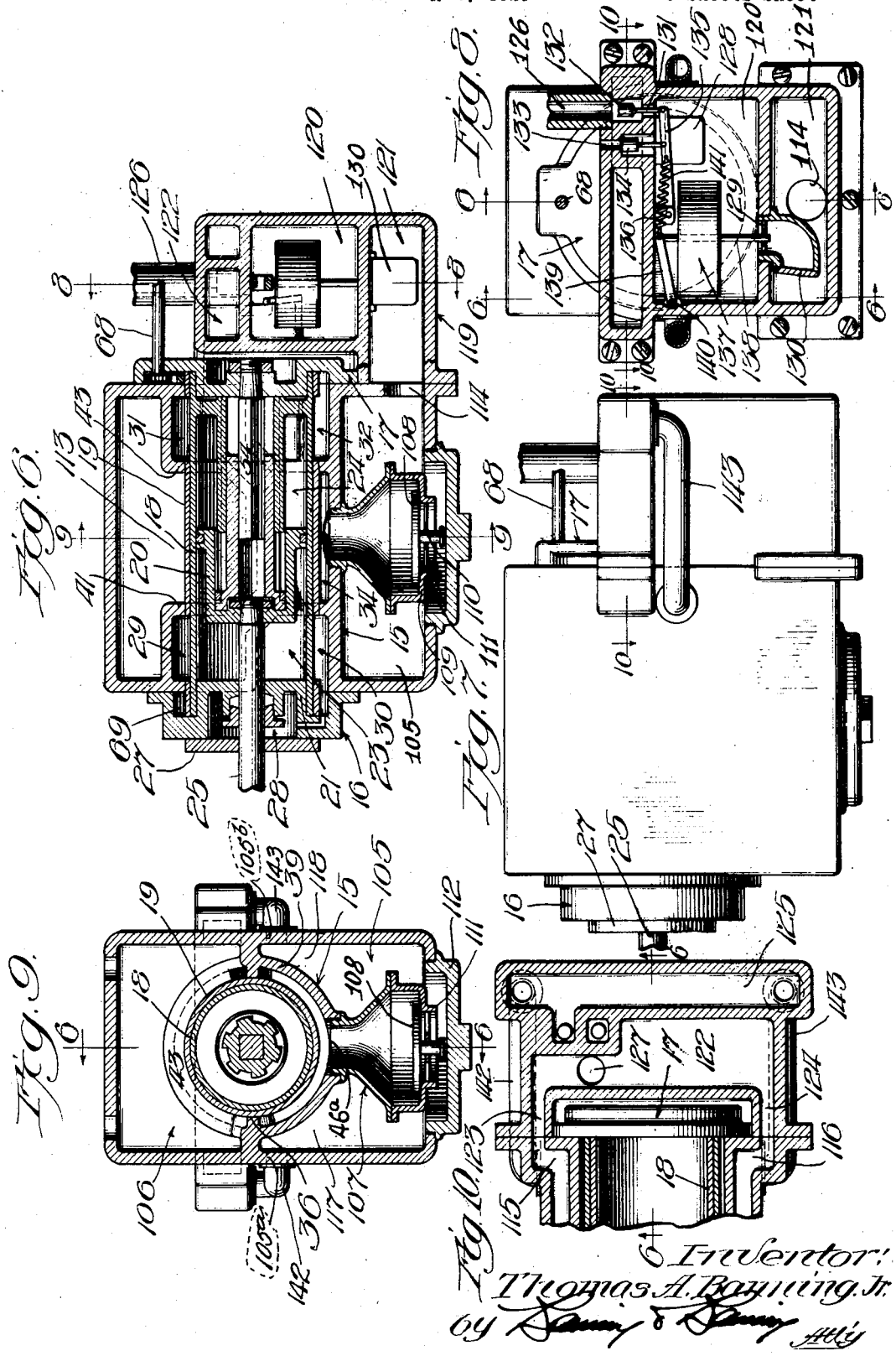

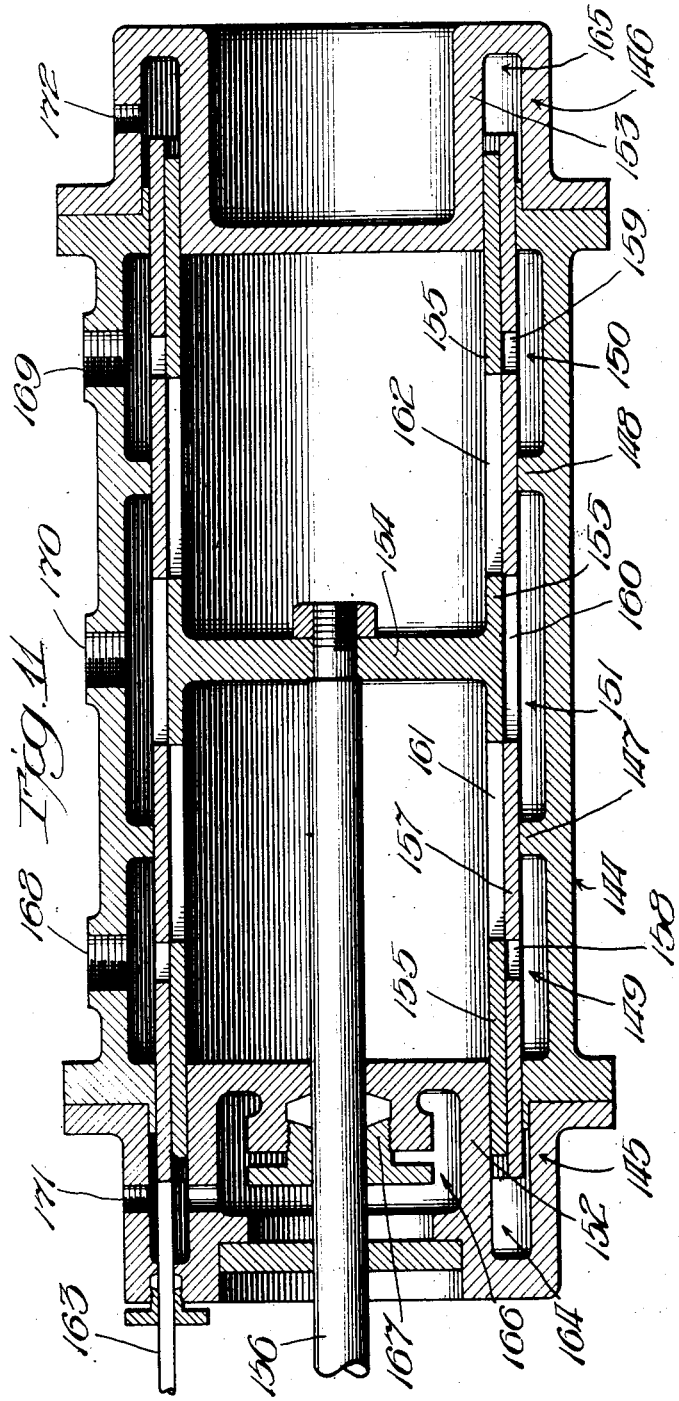

Patented Sept. 13, 1927.

1,642,193

UNITED STATES PATENT OFFICE.

THOMAS A. BANNING, JR., OF WILMETTE, ILLINOIS.

LOCOMOTIVE POWER-REVERSE GEAR.

Application filed August 5, 1925. Serial No. 48,369.

This invention has to do with improvements in locomotive power reverse gears and devices for similar uses. The devices herein disclosed have been designed with a view particularly to the requirements of power reverse gears for locomotives, but it will presently appear that many of the features of invention may be used to advantage in connection with devices for the power operation of other machines than locomtive valve gears. For example, certain of said features may be well used in connection with the steering of automobile trucks, tractors, boats, aeroplanes, etc.; and also for power operation of such devices as stokers, valves, for water turbines and wheels, etc. Inasmuch, however, as the constructions herein disclosed have been designed with a particular view to the requirements in connection with locomotive power reverse gears, I have illustrated and will describe the same particularly as applied to this class of service. In so doing, however, I do not intend to limit myself except as I may do so in the claims.

One of the objects of the invention is to provide a device of this nature which will be absolutely locking and entirely non-creeping, so that it will assume and maintain the exact position dictated by the control valve notwithstanding the jarring and vibration of the powerful forces which may be exerted upon it tending to displace the device from the desired position.

In connection with the above feature it is an object to provide a device of such construction that in case the piston should be momentarily slightly displaced in either direction from the exact position dictated by the position of the control valve, the full operating pressure will be immediately brought to bear on the piston to exactly restore the same to the dictated position. This will make the device non-creeping and will ensure that it will hold the desired position.

Another feature of the invention relates to the provision of a construction such that the seepage of any liquid past the piston will not allow or cause any change in the position thereof since the construction is such that the valve mechanism will at all times ensure the provision of liquid under pressure to restore or retain the piston at the desired position.

Another feature of the invention relates to the provision of a construction such that it is unnecessary to maintain the full operating pressure at all times on either or both faces of the piston, in order to retain the piston at the desired position. This result is accomplished by reason of the fact that a non-compressible liquid, such as oil or water, is used against both faces of the pitson, the same being non-compressible and thereby not allowing displacement of the piston due to compressive action. As a result, when the piston has once been moved to the desired position, the further communication of liquid under pressure may be discontinued and the piston will then be held in the desired position against displacement in either direction by the incompressible nature of the liquid itself.

Another feature of the invention relates to the provision of a construction such that the pressures on all parts of the device will be so equalized that unbalanced forces will be eliminated as much as possible. In this connection, the valve mechanism is perfectly balanced, so that the pressures thereon are equalized and as a result the valve will operate with a minimum of ease and sensitiveness. This is a feature of great importance and value in connection with devices which may be used in conjunction with a centrifugal governor or other similar arrangement.

Another feature of the invention relates to the provision of a construction such that at the points where the piston and control rod pass through the casing, the liquid pressures are eliminated so as to avoid the necessity of using packings and other devices of complicated nature to eliminate seepage.

A further object of the invention relates to the provision of a construction in which the valve mechanism is directly associated with the power piston, so that the control of admission and exhaust of liquid is greatly facilitated, and the use of connections between the valve mechanism and piston is avoided.

In this connection a further object is to provide a construction in which the valve mechanism comprises two valve elements, one under the control of the operator, and the other under the control of the piston, which valve elements complement each other and both of which elements must come into registry in order to shut off the further supply or discharge of liquid. The arrangement is such that whenever the operator's control valve is set at a given position, the complementary piston operated valve must assume the corresponding position in order to shut off the communication of liquid. The instant that such registry no longer exists, the supply of liquid under pressure to the proper side of the piston is established in order to bring the piston to the point where the valve registry again takes place.

A further feature of the invention relates to the provision of simple means for supplying the liquid under pressure. This pressure liquid supply may be provided by any suitable pumping device either as a unit with the power reverse gear or independently thereof; but I have provided a construction such that, when desired, a pumping unit can be very readily associated therewith or connected thereto.

In connection with the foregoing a further object of the invention is to provide suitable receptacles for the storage of a reasonable amount of liquid under the pressure of air or steam, so that this liquid will be immediately available for instant operation of the power reverse gear upon demand. Also to associate with the device a surge tank to which the used liquid is discharged and from which the liquid may be drawn by the pumping device.

A further object of the invention is to provide a check valve construction in conjunction with the piston and valve mechanism so as to absolutely lock the piston against any back movement away from the desired position notwithstanding a momentary reduction of the supply pressure.

Another feature of the invention relates to the provision of pumping means which may be operated by the compressed air of the air brake system of the locomotive for ensuring a constantly available supply of liquid under pressure. This pumping device, when used, is of simple form and will work automatically to supply the liquid under the pressure dictated by the pressure of the compressed air.

Other objects and uses of the invention will appear from a detailed description of the same which consists in the features of construction and combinations of parts hereinafter described and claimed.

In the drawings:

Figure 1 shows a longitudinal section through one form of construction embodying the features of the present invention;

Fig. 2 shows a cross section taken on the line 2—2 of Fig. 1, looking in the direction of the arrows;

Fig. 3 shows a cross section taken on the line 3—3 of Fig. 1, looking in the direction of the arrows;

Fig. 4 shows a cross section taken on the line 4—4 of Fig. 1, looking in the direction of the arrows;

Fig. 5 shows an outside view of the valve operating sleeve;

Fig. 6 shows a longitudinal section through another form of a construction embodying the features of the invention, in which an oil pressure tank and also a surge tank are directly associated with the piston and valve mechanism, and also in which an air operated pump is provided for delivering the oil under pressure to said tank. This figure may also be considered as an irregular section taken on the lines 6—6 of Figs. 8, 9 and 10, looking in the direction of the arrows;

Fig. 7 is an outside elevation corresponding to Fig. 6;

Fig. 8 is a cross section through the pumping device taken on the line 8—8 of Fig. 6, looking in the direction of the arrows;

Fig. 9 is a cross section taken on the line 9—9 of Fig. 6, looking in the direction of the arrows;

Fig. 10 is a fragmentary horizontal section taken on the lines 10—10 of Figs. 7 and 8, looking in the direction of the arrows; and Fig. 11 is a longitudinal section through a modified form of construction.

Referring first to the form of construction shown in Figs. 1 to 5 inclusive, the same includes a cylindrical casing 15 having front and back heads 16 and 17, respectively. Within this casing are cylindrical sleeves 18 and 19 respectively. A portion of the inner sleeve 18 constitutes a cylindrical member within which works a piston 20, and surrounding the same is the control valve sleeve 19. Both of these sleeves 18 and 19 are rotatably mounted with respect to the aforesaid cylindrical casing and end heads; and in order to establish a liquid-tight connection between the inner sleeve 18 and the two end heads, said end heads are carried inwardly as shown at 21 and 22 in order to establish circular members upon which the sleeve 18 is journaled. These together with the piston 20 establish the liquid tight chambers 23 and 24 at the two sides of the piston 20.

The piston carries a piston rod 25 reaching to the outside of the device and preferably working through a stuffing box 26 of the inwardly projecting portion 21 of the front end head 16. A cover plate 27 encloses a space 28 around the stuffing box 26, within which space may collect any liquid which seeps past the stuffing box, such liquid being returned to the low pressure side of the system.

The parts are so formed as to establish semi-circular chambers 29 and 30 at the upper and lower sides of one end of the device and other semi-circular chambers 31 and 32 at the upper and lower sides of the other end of the device. These chambers are preferably formed by suitable ribs which reach inwardly from the cylindrical casing 15 and co-operate with the outside sleeve 19.

Preferably also the parts are so arranged as to present upper and lower semi-circular chambers 33 and 34 intermediate between the positions of the chambers 29 and 31, and 30 and 32 respectively. These chambers 33 and 34 are also established by the same ribs which establish the previously mentioned end chambers.

The aforesaid ribs include the horizontally extending ribs 35, 36 and 37 at one side of the device and 38, 39 and 40 at the other side of the device. In some cases the ribs 35, 36 and 37 will be continuous and also the ribs 38, 39 and 40 will be continuous.

There are also the upper and lower arcuate ribs 41, and 42 intermediate between the chambers 29, and 30 and between the chambers 30 and 34 respectively; and also the upper and lower arcuate ribs 43 and 44 between the chambers 33 and 31 and 34 and 32 respectively.

As clearly evident by the dotted lines in Fig. 1, the ribs 41, 36 and 43 are continuous; the ribs 35 and 42 are continuous; and the ribs 37 and 44 are continuous. Passages 45 and 46 are thus established connecting the lower central chamber 34 with the upper end chambers 29 and 31.

On the other side of the device from that illustrated in Fig. 1, the ribs 42, 39 and 44 are continuous; the ribs 38, and 41 are continuous; and the ribs 40 and 43 are continuous. These also serve to provide between them passages similar to 45 and 46, but facing in the contrary direction from that illustrated in Fig. 1 so as to join the upper central chamber 33 with the lower end chambers 30 and 32. Of these other passages just referred to, one of them appears in Fig. 3 and is designated 45ª. It slants downwardly and away from the observer.

A connection 46ª reaches into the lower central chamber 34, and a connection 47 into the upper central chamber 33. Liquid under pressure is delivered to the chamber 34 by the connection 46ª, and the liquid discharged by the device is delivered from the chamber 33 by the connection 47.

The valve sleeve 19 is provided with upper and lower inlet and discharge ports 48 and 49 communicating respectively with the chambers 29 and 30 at one end of the device and also with upper and lower ports 50 and 51 communicating respectively with the chambers 31 and 32, at the other end of the device. The piston sleeve 18 is provided with a port or ports 52 at one end of the device opposite to the chambers 29 and 30 respectively, and also a port or ports 53 at the other end of the device opposite to the chambers 31 and 32. Comparison of Figs. 2 and 4 shows that the ports 52 and 53 face in opposite directions compared to the center line of the machine.

The parts are so arranged that when the valve and piston sleeves are in registry they seal their respective ports; in other words, these two sleeves complement each other and when the valve sleeve is turned to a given position the piston sleeve can be turned to a corresponding position where the two sleeves each complement each other and seal their respective ports. In the particular position illustrated in Figs. 1, 2 and 4, the piston itself stands in a central position and both of the sleeves are turned to a position which is central with respect to the horizontal plane passing through the axis of the device.

Manifestly, if the valve sleeve 19 should be turned in the clockwise direction when looking at Figs. 2, 3 and 4, the ports 48 and 52 would communicate with the chamber 23 at the front end of the piston 20, but the ports 52 and 49 would be sealed. Consequently, liquid under pressure is allowed to flow from the pressure chamber 29 into the space 23 against the front face of the piston 20. Such clockwise rotation of the valve sleeve 19 would also place the ports 51 and 53 at the other end of the machine in communication with the bottom chamber 32, and the space 24 at the bottom side of the piston 20. This would allow liquid to be discharged from the space 24 into the chamber 32 at the same time the ports 50 and 53 would be sealed from each other.

As a result of the above the piston would be forced towards the right in Fig. 1 and such movement would continue as long as the above port relationship was maintained.

Means, presently to be described, are provided for turning the piston sleeve 18 in one direction or the other depending upon the direction of piston travel. The arrangement is such that in the example just given where the valve sleeve 19 is turned in a clockwise direction so as to force the piston towards the right, the piston sleeve 18 will be compelled to rotate in the clockwise direction proportionally to the amount of piston travel. As a result the very movement of the piston itself will tend to again bring the piston sleeve into proper register with the valve sleeve so as to close the ports.

Comparison of the figures will also show that if the valve sleeve 19 should be turned in the counter clockwise direction, the liquid under pressure will be delivered against the opposite face of the piston and the liquid at the first mentioned face will be allowed to discharge, so that the piston can travel towards the left.

It is further evident that in each case the turning of the piston sleeve itself is proportionally to the piston travel and will result in a sealing of the ports at the time when the piston reaches a position corresponding to the position of the control valve sleeve.

It is also evident that when the piston reaches the proper position to close the ports the further delivery of liquid under pressure is discontinued and the liquid against the opposite face of the piston will tend to lock the piston against further movement in either direction. Assume, however, that a force is exerted on the piston tending to move it in either direction from the position of sleeve registry. The instant that a very slight piston movement takes place the piston sleeve will be turned enough to cause registry of the ports with the pressure liquid chamber at the end of the device to resist such movement, so that instantly the movement of the piston will be checked. The lap of the valve ports can be made very small, so that a practically imperceptible movement of the piston will cause this result. Consequently, the movement of the piston in either direction will be effectively resisted. If a sufficient force should be exerted on the piston to more than balance the full amount of liquid pressure exerted against the face of the piston, it would then be possible to force the piston against such pressure and drive liquid back into the pressure chambers 29 and 30 and from there into the central chamber 34 and discharge the same through the pressure inlet connection 46ª. By placing a check valve in the connection 46ª, as will be presently explained, such backward movement of liquid may be prevented and, therefore, the device when so used will absolutely lock the piston against movement in either direction except by the use of a force sufficient to damage the machine.

The means for turning the piston sleeve 18 proportionally with respect to piston travel will now be described. Reaching inwardly from the cylinder head 17 is a rod 54 which is non-rotatably connected to said cylinder head. This rod is preferably squared and has a tapered head 55 which can be drawn snugly into the cylinder head by a nut 56. When the nut is tightened up the rod is very rigidly held; but by loosening the nut and driving the rod slightly inwards, it can be loosed up and turned to a new position of adjustment and then the nut can again be tightened so as to hold it rigidly in this new position.

A collar 57 has a squared opening to receive the rod 54, said collar sliding on the rod, but being held by the rod against rotation. The collar 57 has a flange 58 at its inner end. The end of this flange rests against the face of the piston, but the back face of the flange is engaged by a ring 59 secured to the piston. As a result the piston 20 and the collar 57 may on occasion turn slightly with respect to each other, but the collar is compelled to travel back and forth with the piston. The outer face of the collar is provided with a series of helical grooves 60, as shown in Fig. 5.

A collar 61 surrounds the collar 57 and is provided with helical teeth and grooves corresponding to the teeth and grooves 60 of the collar 57. The collar 61 is drivingly connected to the valve sleeve 18 by a radial flange 62 at the back end of the machine, so that rotation of the collar 61 is immediately communicated to the piston sleeve 18.

The complementary grooves in the collars 57 and 61 are so formed that the piston sleeve 18 is turned back and forth in exact harmony and proportionally with the back and forth piston movements so as to cause proper relative movements between the valve and piston sleeves.

In order to allow for a maximum amount of rotation of the valve sleeve 19 in either direction from the neutral position, its ports 48 and 49 should stand at the topmost and lowermost positions when the piston stands in the center of its movement. At this time also the piston sleeve should stand in the proper position to seal the ports. The rod 54 can be turned to the proper point to cause sealing of the ports when the valve sleeve and piston are at the position just referred to. The rod 54 can then be locked by tightening up the nut 56 and the device will thereafter be in such condition that the valve sleeve can work symmetrically to both sides of the neutral position.

In case the sleeve 57 should be rigidly connected to the piston 20 without rotation, it would be necessary to turn the piston and piston rod when making such initial adjustment. This might be of disadvantage, since it would be necessary to disconnect the piston rod from the cross head block. The use of an arrangement which allows a slight rotation between the piston and sleeve 57 makes it unnecessary to turn the piston during this adjustment. Furthermore, this type of construction also makes it possible for the piston and piston rod to undergo slight rotations in their back and forth movements without in any manner interfering with the accuracy of operation of the piston sleeve 18.

The segment 62 is preferably cut away at one side 64, as shown in Fig. 4, so that said segment does not at all obstruct the full opening of the ports at the back end of the machine.

Suitable drain passages 65 are provided in the front end of the collar 57 so as to allow proper circulation of liquid into and out of the collar 57 as it moves back and forth on the rod 54.

The valve sleeve 19 may be turned under control of the operator in any convenient manner. For this purpose, I have illustrated a segmental rack bar 66 on the back end of said sleeve, the same being operated by a pinion 67 on the control shaft 68. Said control shaft reaches through the back head 17 and is preferably connected to the engineer's control handle.

The upper and lower central chambers 33 and 34 are preferably of double length as compared to the adjacent end chambers 29 and 31 and 30 and 32. The lower central pressure chamber 34 is therefore equal in size to the upper end pressure chambers 29 and 31. Likewise, the upper central discharge chamber 33 is equal in size to the lower end discharge chambers 30 and 32. As a result the upward and downward thrusts on the valve sleeve are neutralized and balanced about a center, so that side thrusts on the valve sleeve is practically eliminated. This is of importance when it is considered that the combined areas of the pressure chambers 29 and 30 is of substantial size and that the liquid pressures are exerted on the full area thereof.

It will also be observed that there is a low pressure chamber 69 around the top half of the front head 16 and another low pressure chamber 70 around the top half of the back head 17. The low pressure chambers 30 and 32 at the bottom sides of the machine communicate directly with these chambers 69 and 70, respectively. There is also a drain passage 71 reaching from the stuffing box chamber 28 to the low pressure chamber 30 at the front end of the machine. Consequently, the ends of the machine are entirely surrounded by low pressure liquid chambers and any seepage of liquid past the valve sleeve will be caught in these low pressure chambers and be returned to the system. Consequently, the tendency for liquid to leak past the piston rod or past the valve control rod 68 will be reduced to a minimum.

It is also noted that the full working stroke of the piston from one end to the other is accomplished along that section of the piston sleeve 18 which is unported and lies opposite to the chambers 33 and 34. As a consequence, the piston itself also travels in a perfectly cylindrical surface and it can easily be provided with a piston ring 72, as shown in Fig. 1, in order to reduce seepage of liquid.

The necessary operating liquid under pressure may be derived from any convenient source or from a pumping mechanism specially constructed or provided to meet the requirements of the present device.

In Figs. 6 to 10 inclusive, I have shown another arrangement for providing the necessary liquid under pressure including a pumping unit which may be used as a unit with the power reverse gear itself. This pumping unit may be of any suitable form. For example, it may consist of an air pump making use of compressed air from the air brake system.

In the construction of Figs. 6 to 10 inclusive, I have also shown a pressure tank for the liquid under pressure as an integral unit with the power reverse gear itself and also I have shown a storage tank of suitable capacity for receiving the discharge liquid as delivered from the piston. This feature of the invention may be used either in conjunction with the pumping device as a unit with the power reverse gear or in conjunction with some other pumping device such as the centrifugal pump arrangement already referred to.

In the present case, I provide a liquid pressure chamber 105 beneath the power reverse gear and a liquid receiving or storage chamber 106 above the power reverse gear. The arrangement and construction of the power reverse gear itself are substantially the same as that already explained in connection with Figs. 1 to 5 inclusive, and it is not deemed necessary to repeat the description.

The chambers 105 and 106 are formed as extensions below and above the cylindrical casing of the reverse power gear. Reaching down from the liquid pressure inlet 46$^a$ is a riser pipe 107, the lower portion of which is flared out sufficiently to receive a diaphragm check valve 108. The same, normally seats against the floor 109 of the flared out portion aforesaid. A guide stem 110 is provided for guiding the check valve.

The extreme lower end of the riser pipe includes a flange 111 which reaches down into a well 112 consisting of a removable inverted cup at the lower end of the pressure chamber 105. By this arrangement a constant supply of liquid under pressure is secured as long as there remains any liquid under pressure within the well.

The upper discharge opening 47 may communicate directly with the storage chamber 106, but it will be noted that the waste liquid delivered from either end of the piston upwardly into the central chamber 33 might be allowed to overflow into the storage chamber 106 at any point above the central plane of the device. Consequently, in the construction of Figs. 6 to 10 inclusive, I have shown the upper central portion of the cylindrical casing as being cut away at 113, so that the liquid may be discharged directly into the storage chamber 106 without having to rise the additional semi-diameter of the piston.

At the back end of the pressure chamber 105 is a liquid pressure connection 114 through which the supply of pressure liquid is received. At the lower back corners of the storage chamber 106 are the delivery passages 115 and 116, best shown in Fig. 10. These are low down in the chamber 106 and just above the level of the partitions 37 and 40.

At the upper rear corners of the pressure chamber 105 are a pair of openings 105ª and 105ᵇ to which may be connected compressed air pipes, or said openings may be sealed or not provided at all, depending on the pump means which is to be used.

Assuming that the openings aforesaid are sealed or closed liquid under pressure forced into the chamber 105 through the connection 114 will trap air in the upper portion of the chamber 105 including the upper corners 117 and 118 thereof. Owing to the nature of the power reverse gear, the volume of these corner sections is relatively small as compared to the full width of the lower portion of the chamber 105. Consequently, the liquid under pressure can be forced into the chamber 105 so as to raise the liquid level therein well up towards the bottom of the cylindrical power reverse gear, thus providing an ample quantity of liquid and compressing the air in the relatively smaller upper corner portions. This liquid under pressure will be immediately available and can be delivered to the piston through very large passages of very short length. The necessary liquid for replenishment can be allowed to accumulate at slower rate from the pumping apparatus.

The pumping unit, illustrated in detail in Figs. 6 to 10 inclusive, includes a body member 119 having a central air pumping chamber 120, a lower liquid pressure discharge chamber 121, and an upper liquid receiving chamber 122. The latter chamber, as shown in Fig. 10, reaches across the pumping unit and has the ports 123 and 124 which are adapted to communicate with the passages 115 and 116 respectively.

In the upper portion of the device and behind the passage 122 is a compressed air passage 125 which receives compressed air from a suitable supply through a pipe 126. Such supply, for example, may be the air brake system of the locomotive.

Reaching downwardly from the passage 122 is a port 127 the lower end of which is controlled by a flap valve 128 which rests against a slightly projecting valve seat, so that it tends to close by gravity.

Reaching from the pumping chamber 120 downwardly into the pressure chamber 121 is another port 129, the lower end of which is also closed by a flap valve 130. This also normally seats against a forwardly projecting valve seat, so that it tends to seat by gravity. Between the passage 125 and the pumping chamber 120 is a compressed air port 131 which may be closed by a valve 132 when said valve is drawn down. There is also a vent port 133 leading from the pumping chamber 120 to atmosphere and under the control of another valve 134 which seats when forced upwards.

Within the pumping chamber 120 is a light lever 135 which connects to the valve stems of both of the valves 132 and 134, said lever being pivoted at the point 136. A float 137 works up and down in the chamber 120 being guided by a stem 138. The upper end of this stem connects to a link 139 pivoted to the wall of the pumping chamber at the point 140. A spring 141 connects the link 139 with the lever 135 at such points that the rising and falling of the float will snap the lever 135 up and down by a toggle action. When the liquid level falls sufficiently the lever 135 will be reversed from the position shown in Fig. 8 so as to close the port 131 and discontinue the supply of compressed air simultaneously opening the vent 133 and allowing the air pressure in the chamber 120 to fall to atmospheric. When this takes place the liquid in the passage 122 will drain through the flap valve 128 into the chamber 120 and will cause the float to rise. When the float rises sufficiently the lever 139 will be snapped up again into the position of Fig. 8 so as to close the vent 133 and open the compressed air port 131. Thereupon full air pressure will be established in the chamber 120 and back flow into the upper passage 122 prevented by the flap valve 128.

The ends of the compressed air passage 125 connect by pipes 142 and 143 with the upper rear corners of the liquid pressure chamber 105, as clearly indicated in Fig. 9 particularly. Consequently, pressure within the chamber 105 is always the full air pressure. This is also the pressure existing in the chamber 121 by reason of the connection 114. As soon, therefore, as the pressure in the pumping chamber 120 is again established, liquid will flow from the chamber 120 down through the flap valve 130 into the chamber 121 and through the passage 114 into the pressure chamber 105. This action may continue until the liquid levels in the chambers 105 and 120 are equalized. If the level of liquid in the chamber 105 is relatively low, the float 137 will fall enough to reverse the valve mechanism and allow a new charge of liquid to run into the chamber 120, which liquid at the right time will be delivered under pressure into the system.

It is also observed that the pressure of the liquid in the chamber 105 is also the full amount of the air pressure supplied by the pipe 126, notwithstanding temporary depletion of the liquid contained in the chamber 105.

I prefer to form the pumping unit in such a way as not to interfere with the presence of the rear head 17 on the power reverse gear. Furthermore, I prefer to so arrange the parts that the pumping unit can be set into place and removed as a unit. This will make it possible to use the power reverse gear optionally either with the pumping unit as an entire self-contained device or by the establishment of suitable connections to an outside pumping unit, as already explained. When, however, the pumping device is a unit with the power reverse gear there is only one connection necessary to be made to the entire arrangement, being the connection of the air pipe 126.

In Fig. 11 I have shown a modified construction of power reverse gear embodying certain of the features of the present invention in which use is made of a slidable control valve as distinguished from a rotatable control valve. In the present case the device includes a cylindrical chamber 144 having the end heads 145 and 146. The member 144 has the encircling ribs 147 and 148 which establish the annular pressure chambers 149 and 150 at the ends of the device together with a low pressure liquid chamber 151 at the center of the device.

The end heads 145 and 146 are provided with inwardly reaching extensions 152 and 153 similar to those of the previous form of construction. The piston 154 includes a slidable piston valve 155 which slides back and forth with the piston and piston rod 156. Surrounding the piston valve 155 is a control valve 157, said control valve lying between the chambers 149, 150 and 151 and the piston.

The control valve includes the ports 158 and 159 at the positions of the pressure chambers 149 and 150 and also the port 160 at the position of the low pressure chamber 151. The piston valve includes the ports 161 and 162 at the opposite faces of the piston. The piston and control valves are so formed that they complement each other, and for each position of the control valve there is only one position of the piston valve which will seal all of the ports.

The arrangement is such that upon shifting the control valve in either direction liquid under pressure will be admitted to one face of the piston and liquid will be discharged from the other face thereof, thus causing the piston to move in the same direction as the control valve. Such movement will be continued until the piston valve is brought into registry with the control valve to seal the ports. The actions will be well understood from examination of Fig. 11, and their functions and uses are similar in many respects to those already explained with respect to the previous type of construction.

The control valve is conveniently operated by means of a rod 163 reaching through the end head 145.

Low pressure chambers 164 and 165 are established in the end heads and at the ends of the valve members, and preferably a low pressure chamber 166 is also established around the stuffing box 167 where the piston rod passes through the front head 152. Liquid under pressure is delivered to the chambers 149 and 150 by the connections 168 and 169, and the return liquid is taken from the chamber 151 by a connection 170. Other connections 171 and 172 are provided for connecting the chambers 164 and 165 to the low pressure side of the system.

It will also be observed that the general arrangements of power reverse gear herein disclosed lend themselves especially well for the present class of service because the control valve in each case may be operated by the application of a very small amount of force. It can, therefore, be easily operated by a sensitive governing device such as the centrifugal governor.

While I have herein shown and described only certain embodiments of the features of my present invention, still I do not intend to limit myself to the same, except as I may do so in the claims.

I claim:

1. In a device of the class described, the combination of a rotatable cylindrical chamber sleeve, a stationary cylindrical casing within which said sleeve is rotatably mounted, cylinder heads closing the ends of the cylindrical casing and reaching into the ends of the rotatable cylindrical chamber sleeve in sealing engagement therewith, a piston slidably working within the rotatable chamber sleeve, a piston rod reaching therefrom through one head of the casing, a stationary rod reaching inwardly from the other head of the casing, means for adjusting the angular position thereof with respect to the casing, a rotatable collar surrounding said stationary rod, an operative connection between the same and the rotatable cylindrical chamber sleeve, an operating flange intermediate between the stationary rod and the collar and operatively connected to the piston to travel back and forth therewith, means in conjunction with the stationary rod, operating flange and collar effective to rock the collar and rotatable cylindrical chamber sleeve with back and forth movements of the piston, a rotary valve sleeve surrounding the rotatable cylindrical chamber sleeve within the cylindrical casing, passages in the casing for the supply of liquid under pressure to curved areas at both ends of the valve sleeve each embracing substantially one half the circular arc on one side of the device, other passages in the casing for the supply of liquid under pressure to a curved area substantially one half the circular arc of the valve sleeve at the other side of the machine and substantially equal to the combined area of both of the first mentioned areas and in communication therewith to establish a balance of pressure, passages in the cylindrical casing in communication with each other for low pressure liquid embracing the circular areas of the valve sleeve opposed to said last named passage, co-operating ports in the valve sleeve and rotatable cylindrical chamber sleeve for the purpose specified, and means under control of the operator for turning the valve sleeve, substantially as described.

2. In a device of the class described, the combination of a rotatable cylindrical chamber sleeve, a stationary cylindrical casing within which said sleeve is rotatably mounted, cylinder heads closing the ends of the cylindrical casing, a piston slidably working within the rotatable chamber sleeve, a piston rod reaching therefrom through one head of the casing, a stationary rod reaching inwardly from the other head of the casing, means for adjusting the angular position of said rod with respect to the casing, a rotatable collar surrounding said stationary rod, an operative connection between said collar and the rotatable cylindrical chamber sleeve, an operating flange intermediate between the stationary rod and the collar and operatively connected to the piston to travel back and forth therewith, means in conjunction with the stationary rod, operating flange and rotatable collar effective to rock the collar and cylindrical chamber sleeve with back and forth movements of the piston, a rotary valve sleeve surrounding the rotatable cylindrical chamber sleeve within the cylindrical casing, passages in the casing for the supply of liquid under pressure to curved areas at both ends of the valve sleeve each embracing substantially one half of the circular arc on one side of the device, other passages in the casing for the supply of liquid under pressure to a curved area substantially one half the circular arc of the valve sleeve at the other side of the machine and substantially equal to the combined area of both of the first mentioned areas and in communication therewith to establish a balance of pressure, passages in the cylindrical casing in communication with each other for low pressure liquid embracing the circular areas of the valve sleeve opposed to said last named passages, co-operating ports in the valve sleeve and rotatable cylindrical chamber sleeve for the purpose specified, and means under control of the operator for turning the valve sleeve, substantially as described.

3. In a device of the class described, the combination of a rotatable cylindrical chamber sleeve, a stationary cylindrical casing within which said chamber sleeve is rotatably mounted, cylinder heads closing the ends of the cylindrical casing, a piston slidably working within the rotatable chamber sleeve, a piston rod reaching therefrom through one head of the casing, a stationary rod reaching inwardly from the other head of the casing, means for adjusting the angular position of said rod with respect to the casing, a rotatable collar surrounding said stationary rod, an operative connection between said collar and the cylindrical chamber sleeve, an operating flange intermediate between the stationary rod and the collar and operatively connected to the piston to travel back and forth therewith, means in conjunction with the stationary rod, operating flange and collar effective to rock the collar and rotatable cylindrical chamber sleeve with back and forth movements of the piston, a rotary valve sleeve surrounding the cylindrical chamber sleeve within the cylindrical casing in communication with each other, passages in the rotatable casing for the supply of liquid under pressure to curved areas at both ends of the valve sleeve, passages in the cylindrical casing in communication with each other for low pressure liquid embracing the opposing circular areas of the valve sleeve, co-operating ports in the valve sleeve and rotatable cylindrical chamber sleeve for the purpose specified, and means under control of the operator for turning the valve sleeve, substantially as described.

4. In a device of the class described, the combination of a rotatable cylindrical chamber sleeve, a stationary cylindrical casing within which said sleeve is rotatably mounted, cylinder heads closing the ends of the cylindrical casing, a piston slidably working within the rotatable chamber sleeve, a piston rod reaching therefrom through one head of the casing, a stationary rod reaching inwardly from the other head of the casing, a rotatable collar surrounding said stationary rod, an operative connection between said collar and the rotatable cylindrical chamber sleeve, an operating flange intermediate between the stationary rod and the collar and operatively connected to the piston to travel back and forth therewith, means in conjunction with the stationary rod, operating flange and collar effective to rock the collar and rotatable cylindrical chamber sleeve with back and forth movements of the piston, a rotary valve sleeve surrounding the rotatable cylindrical chamber sleeve within the cylindrical casing in communication with each other, passages in the casing for the supply of liquid under pressure to curved areas at both ends of the valve sleeve, passages in the cylindrical casing in communication with each other for low pressure liquid embracing the opposing circular areas of the valve sleeve, co-operating ports in the valve sleeve and cylindrical chamber sleeve for the purpose specified, and means under control of the operator for turning the valve sleeve, substantially as described.

5. In a device of the class described, the combination of a rotatable cylindrical chamber sleeve, a stationary cylindrical casing within which said sleeve is rotatably mounted, cylinder heads closing the ends of the cylindrical casing, a piston slidably working within the rotatable chamber sleeve, a piston rod reaching therefrom through one head of the casing, a stationary rod reaching inwardly from the other head of the casing, means for adjusting the angular position of the rod with respect to the casing, means in conjunction with the piston and said rod, effective to rock the rotatable cylindrical chamber sleeve harmoniously with back and forth movements of the piston, a rotary valve sleeve surrounding the rotatable cylindrical sleeve within the chamber casing, passages in the casing in communication with each other for the supply of liquid under pressure to curved areas at both ends of the valve sleeve, passages in the cylindrical casing in communication with each other for low pressure liquid embracing the opposing circular areas of the valve sleeve, co-operating ports in the valve sleeve and rotatable cylindrical chamber sleeve for the purpose specified, and means under control of the operator for turning the valve sleeve, substantially as described.

6. In a device of the class described, the combination of a rotatable cylindrical chamber sleeve, a stationary cylindrical casing within which said sleeve is rotatably mounted, cylinder heads closing the ends of the cylindrical casing, a piston slidably working within the rotatable chamber sleeve, a piston rod reaching therefrom through one head of the casing, means in conjunction with one of the cylinder heads and the piston and the rotatable cylindrical chamber sleeve effective to rock the rotatable cylindrical chamber sleeve harmoniously with back and forth piston movements, a rotary valve sleeve surrounding the rotatable cylindrical chamber sleeve within the cylindrical casing, suitable passages within the casing for the delivery of liquid under pressure to and removal of low pressure liquid from selected portions of the valve sleeve, co-operating ports in the valve sleeve and rotatable cylindrical chamber sleeve for the purpose specified, and means under control of the operator for turning the valve sleeve, substantially as described.

7. In a device of the class described, the combination of a rotatable cylindrical chamber sleeve, cylinder heads closing the ends of the same, a piston slidably working within the sleeve, a piston rod reaching therefrom through one of the heads, means in conjunction with the piston and rotatable cylindrical chamber sleeve operative effectively to rotate the sleeve harmoniously with back and forth movements of the piston, a valve sleeve surrounding the rotatable cylindrical chamber sleeve, passages for the delivery to and removal from selected areas of the valve sleeve of liquid under pressure and low pressure liquid respectively, co-operating ports in the valve sleeve and rotatable cylindrical chamber sleeve for the purpose specified, and means under control of the operator for turning the valve sleeve, substantially as described.

8. In a device of the class described, the combination of a rotatable cylindrical chamber sleeve, cylinder heads closing the ends of the same, a piston slidably working within the rotatable chamber sleeve, a piston rod reaching therefrom through one of the heads, means in conjunction with the piston and rotatable cylindrical chamber sleeve operative effectively to rotate the sleeve harmoniously with back and forth movements of the piston, a valve sleeve surrounding the rotatable cylindrical chamber sleeve, passages for the delivery to and removal from selected areas of the valve sleeve of liquid under pressure and low pressure liquid respectively, co-operating ports in the valve sleeve and rotatable cylindrical chamber sleeve for the purpose specified, means for adjusting the angular position of the rotatable cylindrical chamber sleeve for any given longitudinal position of the piston, and means under control of the operator for turning the valve sleeve, substantially as described.

9. In a device of the class described, the combination of companion telescoping sleeves rotatable with respect to each other, a piston mounted for reciprocation back and forth in the central portion of the innermost sleeve, companion ports in the end portions of the sleeves beyond the extreme limits of piston movements, passages for the delivery to and removal from selected areas of the outermost sleeve of liquid under pressure and low pressure liquid respectively, said sleeves being effective to complement each other and seal the ports of the innermost sleeve when the sleeves are in registry, and being effective to establish communication of one face of the piston with pressure passages and the other face thereof with low pressure passages simultaneously, means under control of the operator for turning the outermost sleeve, and means effective to move the innermost sleeve towards the port sealing position whenever the piston moves away from ports establishing communication with the liquid pressure supply passages, substantially as described.

10. In a device of the class described, the combination of companion telescoping sleeves rotatable with respect to each other, a piston mounted for reciprocation back and forth in the innermost sleeve, companion ports in the end portions of the sleeves, passages for the delivery to and removal from selected areas of the outermost sleeve of liquid under pressure and low pressure liquid respectively, said sleeves being effective to complement each other and seal the ports of the innermost sleeve when the sleeves are in registry, and being effective to establish communication of one face of the piston with pressure passages and the other face thereof with low pressure passages simultaneously, means under control of the operator for turning the outermost sleeve, and operative connections between the piston and the innermost sleeve effective to move the same towards the port sealing position whenever the piston moves away from ports establishing communication with the liquid pressure supply passages, substantially as described.

11. In a device of the class described, the combination of companion sleeves rotatable with respect to each other, the innermost of said sleeves constituting a rotatable piston cylinder, a piston mounted for reciprocation back and forth in said sleeve, companion ports in the sleeves at both sides of the piston, passages for the delivery to and removal from selected areas of the outermost sleeve of liquid under pressure and low pressure liquid respectively, said sleeves being effective to complement each other and seal the ports of the innermost sleeve when the sleeves are in registry, and being effective to establish communication of one face of the piston with pressure passages and the other face thereof with low pressure passages simultaneously, means under control of the operator for turning the outermost sleeve, and means effective to move the innermost sleeve towards the port sealing position whenever the piston moves away from ports establishing communication with the liquid pressure supply passages, substantially as described.

12. In a device of the class described, the combination of companion telescoping sleeves movable with respect to each other, a piston mounted for reciprocation back and forth within the innermost sleeve, companion ports in the end portions of the sleeves, passages for the delivery to and removal from selected areas of the outermost sleeve, of liquid under pressure and low pressure liquid respectively, said sleeves being effective to complement each other and seal the ports of the innermost sleeve when the sleeves are in registry, and being effective to establish communication of one face of the piston with pressure passages and the other face thereof with low pressure passages simultaneously, means under control of the operator for moving the outermost sleeve, and means effective to move the innermost sleeve towards the port sealing position whenever the piston moves within said sleeve away from ports establishing communication with the liquid pressure supply passages, substantially as described.

13. In a device of the class described, the combination of companion telescoping sleeves movable with respect to each other, a piston mounted for movement within the innermost sleeve, companion ports in the sleeves, passages for the delivery to and removal from selected areas of the outermost sleeve, of liquid under pressure and low pressure liquid respectively, said sleeves being effective to complement each other and seal the ports of the innermost sleeve when the sleeves are in registry, and being effective to establish communication of one face of the piston with pressure passages and the other face thereof with low pressure passages simultaneously, means under control of the operator for moving one sleeve, and means effective to move the other sleeve towards the port sealing position whenever the piston moves within said sleeve away from ports establishing communication with the liquid pressure supply passages, substantially as described.

14. In a device of the class described, the combination of companion telescoping sleeves movable with respect to each other, a piston within the sleeves and mounted for movement with respect to one of them, companion ports in the sleeves, passages for the delivery to and removal from selected areas of the outermost sleeve of liquid under pressure and low pressure liquid respectively, said sleeves being effective to complement each other and seal their respective ports when the sleeves are in register and being effective to establish communication of one face of the piston with pressure passages and the other face thereof with low pressure passages simultaneously, means under control of the operator for moving one of the sleeves, and means effective to move the other sleeve towards the port sealing position whenever the piston moves away from ports establishing communication with the liquid pressure supply passages, substantially as described.

15. In a device of the class described, the combination of a rotatable cylindrical chamber sleeve, a stationary casing within which said sleeve is rotatably mounted, cylinder heads closing the ends of the cylindrical chamber, a piston slidably working within the rotatable chamber sleeve, a piston rod reaching therefrom through one of the heads, means in conjunction with the piston and rotatable cylindrical chamber sleeve operative effectively to rotate the sleeve harmoniously with back and forth movements of the piston therein, a rotary valve sleeve surrounding the rotatable cylindrical chamber sleeve and within the casing, means under control of the operator for turning the valve sleeve, suitable partitions in the casing establishing a liquid pressure chamber in the lower portion thereof beneath the valve sleeve and rotatable cylindrical chamber sleeve and establishing a low pressure liquid surge chamber in the upper portion of the casing and above the valve sleeve and rotatable cylindrical chamber sleeve, passages in the casing for conducting pressure liquid from the pressure chamber to arcuate areas above the end portions of the valve sleeve, other passages in the casing for establishing communication from arcuate areas below the end portions of the valve sleeve up to the surge chamber, and pumping means in conjunction with the end portion of the casing comprising means for drawing liquid from the surge chamber and placing the same under pressure and delivering the same under pressure to the pressure chamber, substantially as described.

16. In a device of the class described, the combination of a rotatable cylindrical chamber sleeve, a stationary casing within which said sleeve is rotatably mounted, cylinder heads closing the ends of the rotatable cylindrical chamber sleeve, a piston slidably working within the rotatable chamber sleeve, a piston rod reaching therefrom through one of the heads, means in conjunction with the piston and rotatable cylindrical chamber sleeve operative effectively to rotate the chamber harmoniously with back and forth movements of the piston therein, a rotary valve sleeve surrounding the rotatable cylindrical chamber sleeve and within the casing, means under control of the operator for turning the valve sleeve, suitable partitions in the casing establishing a liquid pressure chamber in the lower portion thereof, and establishing a low pressure liquid surge chamber in the upper portion of the same, passages in the casing for conducting pressure liquid from the pressure chamber to arcuate areas above the end portions of the valve sleeve, other passages in the casing for establishing communication from arcuate areas below the end portions of the valve sleeve up to the surge chamber, and pumping means in conjunction with the end portion of the casing comprising means for drawing liquid from the surge chamber and placing the same under pressure and delivering the same under pressure to the pressure tank, substantially as described.

17. In a device of the class described, the combination of a rotatable cylindrical chamber sleeve, a stationary casing within which said sleeve is rotatably mounted, cylinder heads closing the ends of the rotatable cylindrical chamber sleeve, a piston slidably working within the rotatable chamber sleeve, a piston rod reaching therefrom through one of the heads, means in conjunction with the piston and rotatable cylindrical chamber sleeve operative effectively to rotate the sleeve harmoniously with back and forth movements of the piston therein, a rotary valve sleeve surrounding the rotatable cylindrical chamber sleeve and within the casing, means under control of the operator for turning the valve sleeve, suitable partitions in the casing establishing a liquid pressure chamber in the lower portion thereof and establishing a low pressure liquid surge chamber in the upper portion of the same, passages in the casing for conducting pressure liquid from the pressure chamber to areas above the end portions of the valve sleeve, other passages in the casing for establishing communication from areas below the end portions of the valve sleeve up to the surge chamber, and pumping means in conjunction with the end portion of the casing comprising means for drawing liquid from the surge chamber and placing the same under pressure and delivering the same under pressure to the pressure tank, substantially as described.

18. In a device of the class described, the combination of a rotatable cylindrical chamber sleeve, a stationary casing within which said sleeve is rotatably mounted, cylinder heads closing the ends of the cylindrical chamber sleeve, a piston slidably working within the rotatable chamber sleeve, a piston rod reaching therefrom through one of the heads, means in conjunction with the piston and rotatable cylindrical chamber sleeve operative effectively to rotate the sleeve harmoniously with back and forth movements of the piston therein, a rotary valve sleeve surrounding the rotatable cylindrical chamber sleeve and within the casing, means under control of the operator for turning the valve sleeve, suitable partitions in the casing establishing a liquid pressure chamber in the lower portion thereof and establishing a low pressure liquid surge chamber in the upper portion of the same, passages in the casing for conducting pressure liquid from the pressure chamber to areas above the end portions of the valve sleeve, other passages in the casing for establishing communication from areas below the end portions of the valve sleeve up to the surge chamber, and pumping means in conjunction with the end portion of the casing, substantially as described.

19. In a device of the class described, the combination of a rotatable cylindrical chamber sleeve, a stationary casing within which said sleeve is rotatably mounted, cylinder heads closing the ends of the cylindrical chamber sleeve, a piston slidably working within the rotatable chamber sleeve, a piston rod reaching therefrom through one of the heads, means in conjunction with the piston and rotatable cylindrical chamber sleeve operative effectively to rotate the sleeve harmoniously with back and forth movements of the piston therein, a rotary valve sleeve surrounding the rotatable cylindrical chamber sleeve and within the casing, means under control of the operator for turning the valve sleeve, suitable partitions in the casing establishing separate liquid pressure and low pressure liquid surge chambers in the casing, passages for conducting pressure liquid from the pressure chamber to areas adjacent to the end portions of the valve sleeve, other passages for establishing communication from other areas of the valve sleeve to the surge chamber, and pressure liquid supply and liquid delivery connections to and from said chambers, substantially as described.

20. In a device of the class described, the combination of a piston, a movable valve sleeve surrounding the same, means in conjunction with the piston and valve sleeve establishing companion ports at both sides of the piston, a casing enclosing all of said parts, separate pressure liquid supply and low pressure liquid surge chambers in the lower and upper portions of said casing respectively, passages leading from the pressure liquid chamber to valve areas at both sides of the piston, passages leading from other valve areas at both sides of the piston to the liquid surge chamber, and means in conjunction with said casing and both of said chambers for drawing liquid from the surge chamber in the upper portion of the casing and delivering it under pressure to the pressure chamber in the lower portion of the casing comprising a float chamber, a float therein, a gravity supply connection to said float chamber from the liquid surge chamber, a gravity delivery connection from the float chamber to the pressure liquid chamber, valves in both of said connections preventing back movement of liquid, a fluid pressure connection to the float chamber, a vent from the float chamber, valves for said fluid pressure connection and said vent, and operative connections from the float to said valves effective to close the vent and open the fluid pressure valve when the float is at the upper limit of movement and to open the vent and close the fluid pressure valve when the float is at the lower limit of movement, substantially as described.

THOMAS A. BANNING, Jr.